United States Patent [19]
Petaja

[11] 3,886,457
[45] May 27, 1975

[54] LEVEL COMPENSATED FREQUENCY SELECTOR

[76] Inventor: Danny A. Petaja, 3234 Saint Martins Way, Sebastopol, Calif. 95472

[22] Filed: Apr. 12, 1973

[21] Appl. No.: 350,313

Related U.S. Application Data

[63] Continuation-in-part of Ser. No. 346,970, April 2, 1973, abandoned.

[52] U.S. Cl. .......... 325/399; 178/DIG. 13; 325/308; 325/455; 325/457; 325/464

[51] Int. Cl. .......... H04b 1/16; H03j 5/04

[58] Field of Search .......... 325/308, 414, 452, 453, 325/455, 457, 465, 488, 490, 463, 464, 363, 430, 438, 439, 399; 178/DIG. 13, 5.4 MC; 333/81 R

[56] References Cited

UNITED STATES PATENTS

| | | | |
|---|---|---|---|
| 3,002,088 | 9/1961 | Trevor | 325/414 |
| 3,119,080 | 1/1964 | Watters | 325/414 |
| 3,191,127 | 6/1965 | Theriault | 325/414 |
| 3,214,692 | 10/1965 | Karpinsky | 325/363 |
| 3,303,428 | 2/1967 | Zentmaier et al. | 325/414 |
| 3,720,876 | 3/1973 | Montgomery | 325/455 |
| 3,755,763 | 8/1973 | Hoshi | 325/455 |

*Primary Examiner*—Robert L. Griffin
*Assistant Examiner*—Marc E. Bookbinder
*Attorney, Agent, or Firm*—Townsend and Townsend

[57] ABSTRACT

A signal level compensated channel selector is described having a voltage tuned R.F. frequency converter for selectively converting each channel of a multichannel R.F. input signal to an output signal having a predetermined frequency. A ultilization device, e.g., a field strength meter, is coupled to the output of the converter through a voltage tuned attenuator for measuring the R.F. carrier amplitude level of each channel in the input signal. Selective bias voltages for the frequency conversion and attenuation is provided by a pair of ganged potentiometer banks, the output of each of which is coupled to the converter and attenuator, respectively.

10 Claims, 1 Drawing Figure

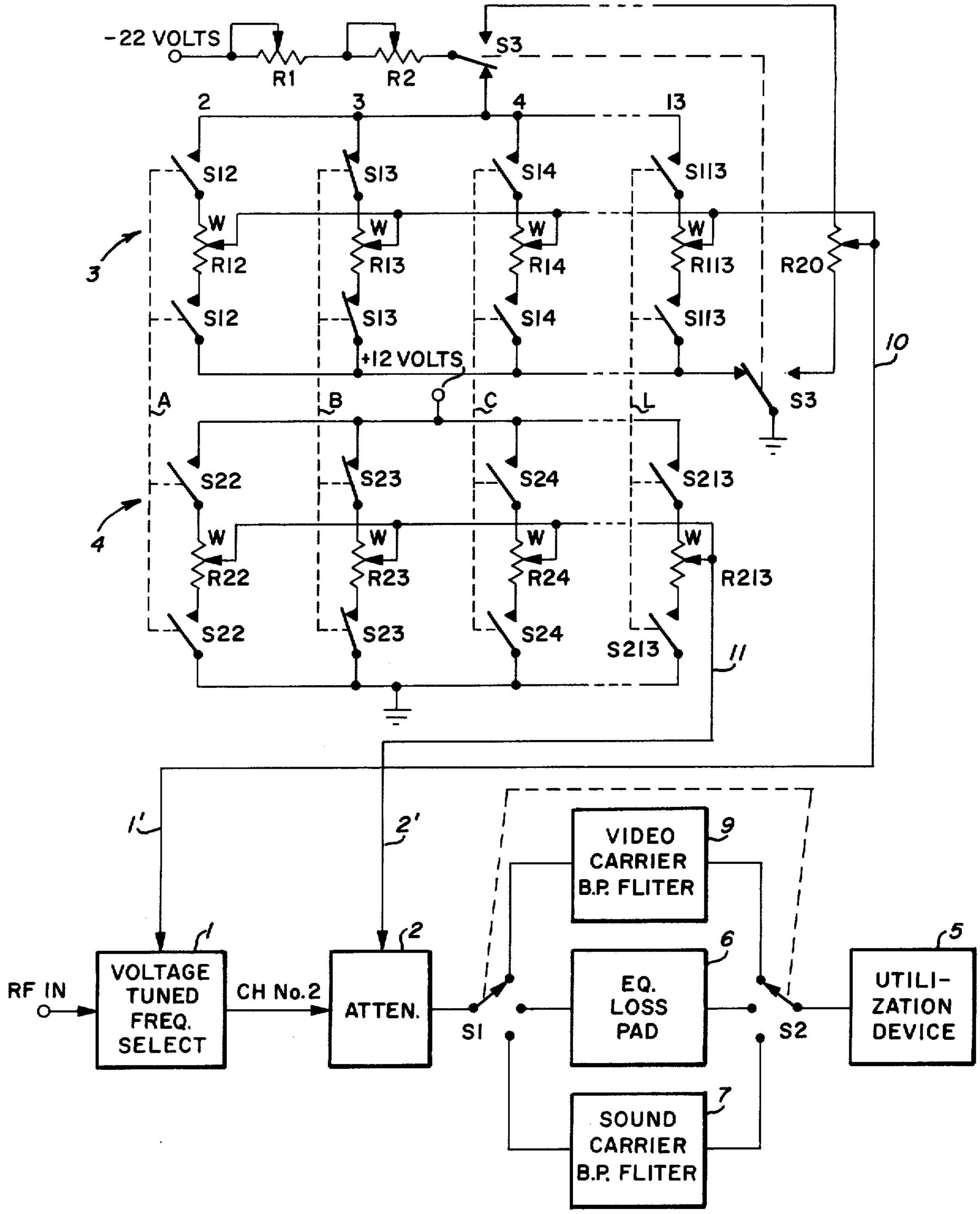
-22 VOLTS
R1
R2
S3
2
3
4
13
S12
S13
S14
S113
W
R12
R13
R14
R113
R20
3
+12 VOLTS
10
A
B
C
L
S22
S23
S24
S213
4
R22
R23
R24
R213
11
1'
2'
VIDEO CARRIER B.P. FLITER
9
RF IN
VOLTAGE TUNED FREQ. SELECT
1
CH No. 2
ATTEN.
2
S1
EQ. LOSS PAD
6
S2
UTILI-ZATION DEVICE
5
SOUND CARRIER B.P. FLITER
7

LEVEL COMPENSATED FREQUENCY SELECTOR

RELATED CASES

This is a continuation in part of parent application U.S. Ser. No. 346,970 filed Apr. 2, 1973, now abandoned.

BACKGROUND OF THE INVENTION

CATV and other multichannel R.F. systems comprise a plurality of R.F. amplifiers placed along the cable at suitably spaced intervals between a transmitter and the receivers for restoring degraded R.F. signals. Each of the amplifiers is provided with a means for adjusting the gain of the amplifier for the purpose of normalizing the amplitude of the carrier signal of each of the separate TV channels over the bandwidth of the amplifier.

Using conventional equipment and measuring techniques, it is the practice presently to couple a field strength meter directly, or with a length of test cable, to the output of an amplifier. The meter is then tuned in succession in the fashion of tuning a radio for maximum signal to the center frequency of each of the selected channels and the indicated amplitude of the different carrier frequencies noted.

Since commercially available meters and test cables are typically non-linear as a function of frequency, it is necessary to use a meter compensation card and, if a test cable is used, a cable compensation card, to obtain a true reading for each of the different frequency channels. Using the compensation cards, a prescribed value is added to or subtracted from the meter reading to obtain a corrected reading for each channel and the amplifier may be adjusted to provide the desired or normalized R.F. carrier output signal amplitude for each selected channel.

If the R.F. signal level for four to six channels is checked in each of ten or more amplifiers, as is required in a typical CATV system, a great number of separate measurements are required. If, in addition to checking the R.F. video channels, it is also necessary to check the R.F. sound channels, the number of required measurements is doubled. The required tuning and use of compensation cards for each measurement thus becomes tedious, time consuming and costly.

SUMMARY OF THE INVENTION

In view of the foregoing, a principal object of the present invention is a signal level compensated channel selector which obviates conventional tuning for each selected channel in a multichannel R.F. input signal and also obviates the use of compensation cards for each required measurement.

In accordance with the above object, a feature of the invention is a voltage tuned frequency converter for selectively converting one or more channels of a multichannel R.F. input signal to an output signal having a predetermined frequency, such as, for example, TV channel 2 at 54 megahertz. The output signal is selectively attenuated by a voltage tuned attenuator and applied to the input of a field strength meter. The control voltage for the converter and attenuator is provided by a pair of ganged preset potentiometer banks.

In the field, the channel selection and appropriate compensation for a true meter reading for each channel is achieved by simply depressing a button which couples predetermined ones of the potentiometers to the converter and the attenuator. The time required to make the necessary measurements and amplifier adjustments in this fashion is found to be reduced to one tenth of the time required using the above described conventional apparatus and techniques.

A further advantage of the present invention is the capability of pre-setting the potentiometer banks to accommodate various lengths of input test cable, thereby obviating the necessity for using any compensation cards in the field to compensate for the attenuation of input signal as a function of frequency and cable length.

DESCRIPTION OF THE DRAWING

The foregoing and other objects, features and advantages of the present invention will be apparent in the following detailed description of the accompanying drawing, which is a schematic of a preferred embodiment of the present invention.

DETAILED DESCRIPTION

The present invention is described herein with respect to a twelve-channel signal level compensated channel selector as is useful, for example, in measuring and adjusting the amplitude level of the R.F. video and sound carriers for selected channels in a CATV system.

Referring to the drawing, there is provided a voltage tuned frequency converter 1, having a bias input 1'. The output of converter 1 is coupled to a voltage tuned R.F. attenuator 2 having a bias input 2'. A pair of ganged potentiometer banks 3 and 4 are coupled to the respective bias inputs of converter 1 and attenuator 2; and a utilization device 5 is selectively coupled, by means of ganged switches S1 and S2, to the output of attenuator 2 through a video bandpass filter 9, an equalization loss pad 6, and a sound carrier bandpass filter 7, for measuring the R.F. signal level of selected channels. Utilization device 5 may be, for example, a field strength meter, an oscilloscope, and R.F. voltmeter, or a TV. Filters 7 and 9 are used when an R.F. voltmeter is used for measuring the video carrier or the sound carrier, respectively.

Converter 1 is further provided with an R.F. input for receiving a multichannel R.F. input signal. The R.F. input signal comprises, for purposes of illustration, CATV channels 2–13 having a bandwidth of 54 to 300 MHz. Internal to converter 1 is a voltage controlled oscillator, not shown, which serves, in response to control potentials from potentiometer bank 3, to convert selected channels of the R.F. input signal to an output signal of a predetermined frequency, such as, for example, channel 2 having a center frequency of 54 MHz. Various specific circuit arrangements for making the frequency conversion may be used and they are not further described as they are well known and are presently used in CATV systems, such as, for example, the circuits described in U.S. Pat. No. 3,333,198 and that used in the CATV 30-channel "Set Commander," manufactured by Jerrold of Philadelphia, Pa.

Voltage tuned R.F. attenuator 2 is, in a preferred embodiment, a high performance PIN diode attenuator, such as, for example, the type manufactured by Hewlett-Packard of Palo Alto, Calif. and described in its application note 936. Characteristic of the PIN diode is its inherent ability to act as a current controlled resistor at R.F. frequencies with a wide resistance range, good linearity and low distortion. Attenuator 2 is responsive to a bias voltage at input 2′ provided by potentiometer bank 4 and provides the appropriate level of attenuation for each selected channel as hereafter described.

Potentiometer banks 3 and 4 coupled to converter 1 and attenuator 2 each comprise a plurality of ganged 10K ohm potentiometers, R12, R13 . . . R113 and R22, R23 . . . R213, respectively. R12 and R22 are associated with channel 2; R13 and R23 are associated with channel 3; and R14 and R24 are associated with channel 4 and so forth, as shown by the numerals above bank 3. Each potentiometer in bank 3 is selectively coupled to a source of negative potential, such as a 22-volt battery, through a 5K ohm potentiometer R1, and a 1K ohm potentiometer R2, by means of the ganged switch S3 and a pair of switches S12, S13, S14 . . . S113. Each potentiometer R12, R13 . . . R113 is provided with a wiper W, these wipers being coupled together and to the bias input 1′ of converter 1 by means of a conductor 10. Each potentiometer in bank 4 is selectively coupled to a source of positive potential, such as a 12-volt battery, by means of a pair of switches S22, S23, S24 . . . S213, associated with each potentiometer, respectively. The wipers W of all the potentiometers R22, R23 . . . R213 are coupled together and to the bias input of attenuator 2 by means of a conductor 11. All of the switches, e.g., S12 and S22, associated with each channel in banks 3 and 4 are ganged as shown by the dashed lines A, B, C, etc.; and, when closed as by a conventional push-button mechanism (not shown), lock out or open any previously closed switches such that only one potentiometer in each of banks 3 and 4 is coupled to its respective source of potential at any given time. A pair of switches, as distinguished from a single switch, is used with each potentiometer for permitting the coupling of all the wipers W in each bank together and to prevent current drain through potentiometers associated with non-selected channels.

In a typical embodiment, the voltage controlled oscillator in converter 1 is responsive to an applied bias of from −3 to −14 volts. Each of the potentiometers in bank 3 is pre-set to provide a predetermined bias voltage within that range for converting each of the twelve channels in the multichannel R.F. input signal. Thus, for example, upon the closing of switches S13, as illustrated, the bias applied to converter 1 is such that to effect a conversion of the R.F. carrier for channel 3 to the R.F. carrier for channel 2. Similarly, the closing of switches S14 effects a conversion of the R.F. carrier of channel 4 to the R.F. carrier for channel 2. Potentiometers R1 and R2 provide for coarse and fine adjustments of the potential applied to bank 3, as may be necessary. In addition, a potentiometer R20 is coupled to the potential source through switch S3 and to conductor 10 for providing variable tuning over the bandwidth of converter 1. Switch S3 thus permits either stepped or continuously variable tuning.

Attenuator 2, such as is commercially available, provides from 1½ to 40 db of attenuation over a range of bias from 0–9 volts. To compensate for any nonlinearity in the utilization devices 5 and/or converter 1, each of potentiometers R22, R23 . . . R213 in bank 4 are pre-set to provide the proper bias and, hence, the appropriate attenuation for each of channels 2, 3 . . . 13, respectively. Since the switches associated with each channel in banks 3 and 4 are ganged, frequency selection and channel conversion and the appropriate compensation are achieved by simply pushing a button, or the like, coupled to the ganging mechanism connecting each pair of associated switches, as previously described.

In the preferred embodiment, converter 1, as is possible with known converters, is arranged to provide gain, such as, for example, 6 db. With 6 db of gain, a test cable of a convenient length connecting the converter 1 to an amplifier may be used to more conveniently make the above described measurements. This is particularly advantageous when adjusting amplifiers mounted near the top of a telephone pole in that it permits the measurements to be made on the ground. A converter gain of 6 db is more than enough to offset the attenuation of the input signal due to the cable which, for typical cable lengths, may be as much as 4.5 db. Perhaps more significant, however, is the advantage obtained with the present invention in that the nonlinear attenuation of the cable as a function of frequency may be compensated for by an appropriate adjustment of the potentiometers in bank 3 and 4 for each channel at the time the potentiometers are pre-set to compensate for the non-linearities of the converter 1 and/or meter 5. This avoids the necessity of using a cable compensation card in the field.

While described for use in measuring and adjusting the R.F. carrier signal level of twelve video or sound channels in a CATV system, it is understood that, by adding additional potentiometers in banks 3 and 4, any desired number of R.F. video and sound channels may be measured. Moreover, by readjusting the potentiometers, any combination of frequencies may be converted to any desired single frequency within the frequency response of the converter and attenuator with appropriate compensation being provided by corresponding adjustments of the potentiometers in banks 3 and 4.

Rather than utilizing the voltage controlled attenuator 2 on the output of the voltage tuned frequency selector 1, it is also possible to utilize an automatic gain control circuit (AGC) in the voltage tuned frequency selector 1 and eliminate the attenuator 2 from the system. The voltage selected by bank 4 for the attenuator 2 would instead be transmitted to the voltage tuned frequency selector to control its AGC circuit and thereby control, i.e., attenuate, the output level thereof. This alternate technique would perform in the same manner as the separate attenuator and voltage tuned frequency selector.

It is understood that the description of the present invention herein is provided for illustrative purposes only and that certain modifications of the circuits described may be made. It is, for example, within the skill of the art to use solid state devices for the described switches and a voltage controlled attenuator and converter of a differing circuit arrangement without departing from the spirit and scope of the present invention as hereinafter claimed.

What is claimed is:

1. In an apparatus including means for selecting and converting a particular channel of a multichannel R.F. input signal to an output signal having a predetermined frequency, a signal level compensating apparatus comprising:

attenuating means coupled to said converting means for selecting one of a plurality of discrete preset attenuation levels each of said levels being associated with a corresponding channel of said multichannel R.F. input signal and for attenuating said output signal in accordance with said selected preset attenuation level; and, means responsive to said attenuated output signal for indicating the signal level of each of said input channels.

2. An apparatus according to claim 1 wherein said attenuating means comprises:

a plurality of switch means for selectively providing a plurality of preset electrical potentials, each associated with a corresponding one of said input channels; and means responsive to each of said electrical potentials for controlling the magnitude of said attenuation of said output signal.

3. An apparatus according to claim 2 wherein said means for selectively providing said plurality of electrical potentials comprises:

a plurality of circuit means coupled to said means responsive to each of said electrical potentials; and means coupled to each of said circuit means for selectively coupling predetermined ones of said circuit means to a source of potential.

4. An apparatus according to claim 3 wherein said converting means further includes a plurality of channel selector switch means and wherein said selective coupling means in said potential providing means comprises switch means associated with each of said channels in said multichannel R.F. input signal, and further comprising:

means for coupling each of said potential providing switch means to a corresponding one of said channel selector switch means whereby a switching of said channel selector switch means will effect a switching of said corresponding potential providing switch means in said attenuating means.

5. An apparatus according to claim 3 wherein each of said plurality of circuit means comprises a potentiometer, the wipers of each of which are coupled to said means responsive to each of said electrical potentials.

6. An apparatus according to claim 1 wherein said means responsive to said attenuated output signal is a field strength indicating apparatus.

7. A signal level compensated channel selector comprising:

means for receiving a multichannel R.F. input signal including a voltage controlled oscillator;

means controlling the frequency of said oscillator for selecting one channel of said multichannel R.F. input signal and for converting said selected channel to an output signal the magnitude of which is a function of said selected channel;

means responsive to said channel selecting and converting means for selecting one of a plurality of discrete preset attenuation levels, each associated with a corresponding one of said input channels, and attenuating said output signal in accordance with said level; and means responsive to said attenuated output signal for indicating the signal level of each of said channels in said multichannel R.F. input signal.

8. A channel selector according to claim 7 wherein said channel selecting and converting means includes a first bank of circuit elements coupled to said oscillator for providing a first plurality of discrete preset electrical potential levels to select a desired one of said channels and convert said selected channel to said output signal and said attenuating means includes a second bank of circuit elements for providing a second plurality of electrical potential levels each associated with a corresponding one of said first plurality of electrical potential levels for each of said channels and further comprising:

means for coupling said first and said second bank of circuit elements for providing simultaneously a selected one of said first plurality of potential levels and the associated one of said second plurality of potential levels.

9. A channel selector according to claim 8 wherein each of said first and said second bank of circuit elements comprises:

a plurality of potentiometers; and switch means for selectively coupling a predetermined one of said potentiometers in each of said banks to a source of potential.

10. In an apparatus including means for selecting and converting a particular channel of a multichannel R.F. input signal to an output signal having a predetermined frequency, a signal level compensating apparatus, comprising:

attenuating means coupled to said channel converting means for attenuating said output signal in dependence upon said selected channel, and including first circuit means for providing a plurality of discrete preset electrical potentials, each associated with a corresponding channel of said input signal, second circuit means responsive to said electrical potentials for controlling the magnitude of said attenuation of said output signal in accordance therewith, third circuit means responsive to the channel selecting and converting means for supplying the one of said electrical potentials associated with said selected channel from said first circuit means to said second circuit means to attenuate said output signal in response thereto;

means responsive to said attenuated output signal for indicating the signal level thereof.

* * * * *